Sept. 22, 1970        K. PUGI        3,530,185

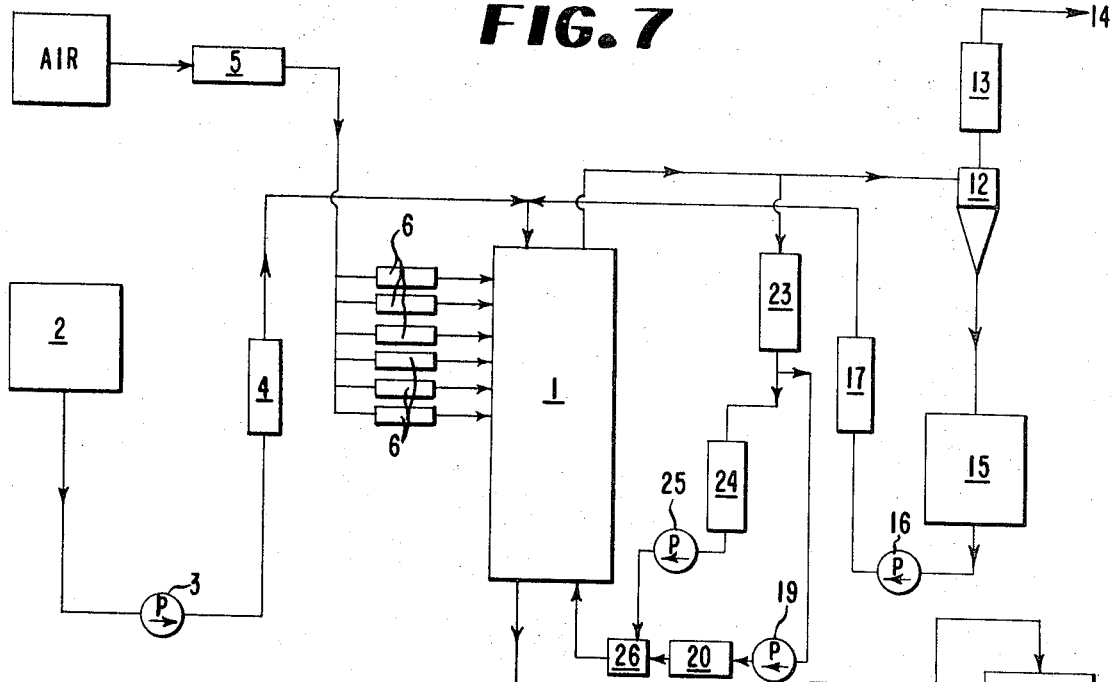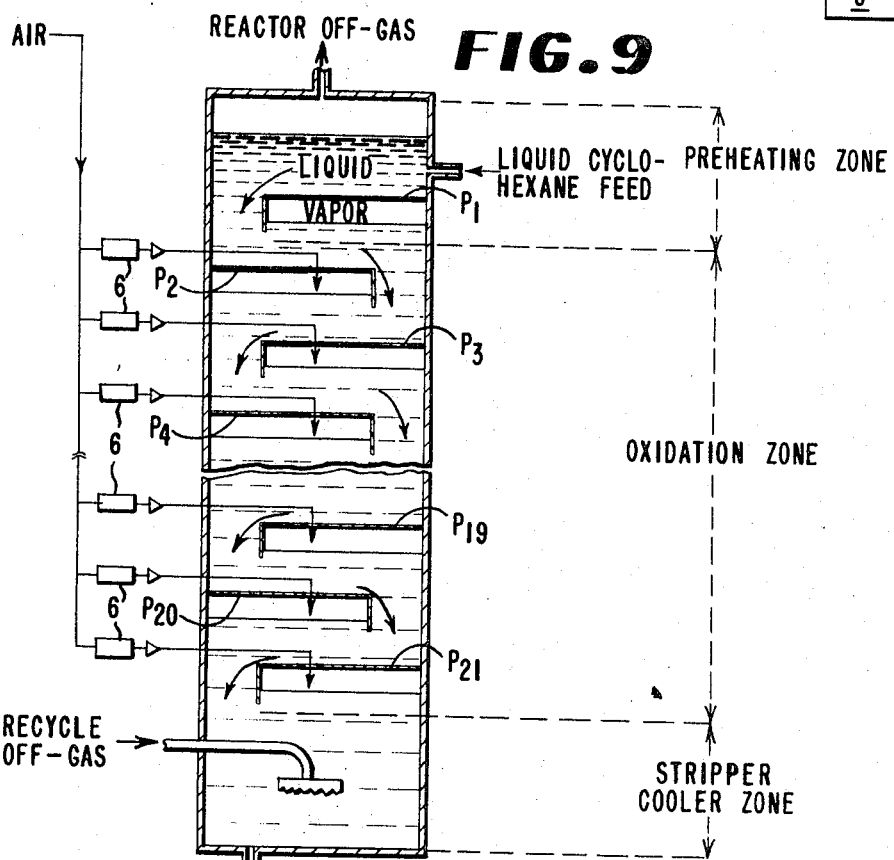

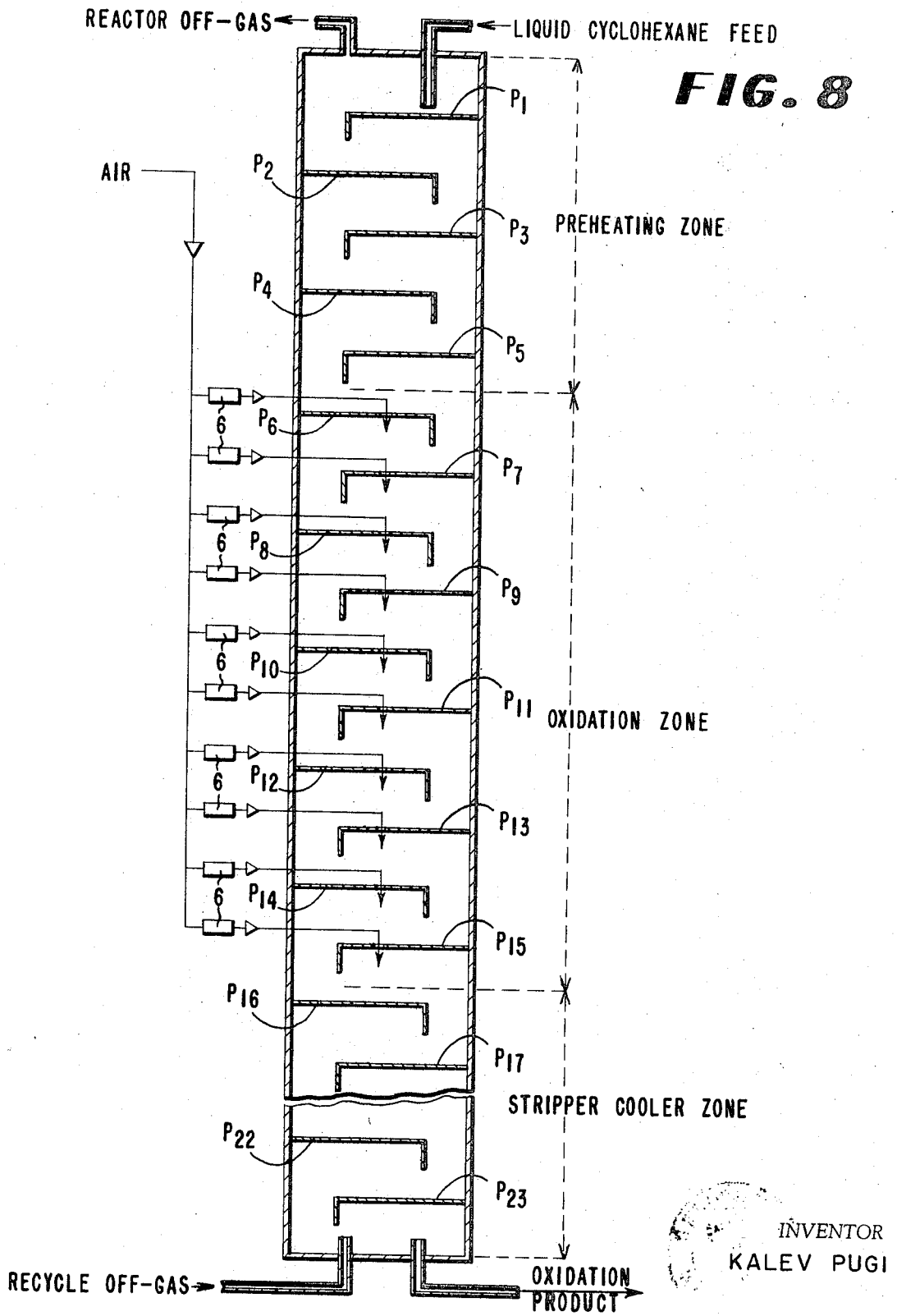

OXIDATION PROCESS

Filed Aug. 8, 1966        7 Sheets-Sheet 7

INVENTOR
KALEV PUGI

BY *Roger A. Hines*

ATTORNEY

United States Patent Office 3,530,185
Patented Sept. 22, 1970

3,530,185
OXIDATION PROCESS
Kalev Pugi, Kingston, Ontario, Canada, assignor, by mesne assignments, to E. I. du Pont de Nemours and Company, Wilmington, Del., a corporation of Delaware
Continuation-in-part of application Ser. No. 432,054, Jan. 25, 1965, which is a continuation-in-part of application Ser. No. 343,911, Feb. 3, 1964. This application Aug. 8, 1966, Ser. No. 570,834
Int. Cl. C07c 45/02
U.S. Cl. 260—586          8 Claims

ABSTRACT OF THE DISCLOSURE

A process for manufacturing precursors of adipic acid by oxidation with an oxygen-containing inert gas which process is conducted in at least three successive oxidation stages by passing a stream of liquid cyclohexane maintained at a temperature in the range of 140 to 200° C. and a pressure in the range of 50 to 350 p.s.i.g. through each successive oxidation stage and by introducing a mixture of gases containing oxygen in each oxidation stage in an amount such that substantially all of the oxygen introduced into each stage is consumed in that stage thereafter causing the residual inert gases to pass countercurrent into the stream of liquid during the passage of the stream through the said stages.

---

This application is a continuation-in-part of U.S. Ser. No. 432,054, filed Jan. 25, 1965 now abandoned, which, in turn, is a continuation-in-part of U.S. Ser. No. 343,911, filed Feb. 3, 1964, now abandoned.

The present invention relates to the oxidation of liquid hydrocarbons with gaseous oxygen and more particularly to the oxidation of volatile cycloalkanes in the liquid phase, particularly cyclohexane or cyclohexane-containing petroleum fractions.

It is known that the oxidation of cyclohexane to partial oxidation products such as cyclohexanone and cyclohexanol, constitutes an important step in the manufacture of nylon intermediates such as adipic acid. The process of oxidizing cyclohexane in the liquid phase to cyclohexanol and cyclohexanone at low conversions and high yields was disclosed by Donald J. Loder in Canadian Pat. 401,788. Loder's process, when carried out on a noncommercial scale, can be made to give cyclohexanol +cyclohexanone yields of about 85 to 95% when the percentage of the cyclohexane molecules oxidized is less than 5%. When the percentage of cyclohexane molecules oxidized is from about 5% to about 12%, the yield of cyclohexanol+cyclohexanone would be about 65% to 85%. In practical commercial operations, it is often necessary to sacrifice yield at any given conversion level in order to have a continuous process which can be run in an economic manner.

In the manufacture of adipic acid from cyclohexane, it was at one time considered that the best results could be obtained by oxidizing cyclohexane to cyclohexanol and cyclohexanone in high yields and low conversion (the yield of cyclohexanol+cyclohexanone is maximum at low conversion) followed by separation of these intermediates, thereafter converting the cyclohexanol to cyclohexanone, and oxidizing the latter to adipic acid with air in a separate operation. However, it was later found that better overall results were obtainable by directly oxidizing a mixture including cyclohexanol and cyclohexanone, obtained as useful oxidation products from the cyclohexane, to adipic acid by means of a nitric acid oxidation process.

It is also known that the quantities of useful oxidation products, i.e., adipic acid precursors, and the by-products of the oxidation of cyclohexane depend upon the temperature, residence time, the oxygen concentration and flow rates. Little significance was attached to the ratio of particular constituents such as cyclohexanol, cyclohexanone and cyclohexylhydroperoxide (CHHP) within the useful oxidation products when all of the useful oxidation products were to be converted to adipic acid with nitric acid. When a mixture of cyclohexanol+cyclohexanone is to be manufactured as the main useful oxidation product, the oxidation reaction should be guided in such a manner that little or no by-product will be formed. Canadian Pat. 666,796 suggests a somewhat complex and time-consuming process in which cyclohexanone and cyclohexanol may be obtained in good yield by, inter alia, partial oxidation of cyclohexane in a liquid system at elevated temperatures and pressures with less than 10% by weight of the cyclohexane input, or gases containing less than 10% of oxygen and by recycling of the unreacted cyclohexane after the reaction mixture has been freed from the cyclohexane peroxide present and from other impurities, and eventually separating the mixture of cyclohexanol and cyclohexanone present in the still bottom by fractionation after the removal of residual cyclohexane.

A process has recently also been disclosed in Belgium Pat. No. 626,227 in which one portion of liquid cyclohexane is partially oxidized with gas containing molecular oxygen and in which another portion of the cyclohexane is vaporized and then introduced into the oxidation zone in order to reheat the reactants.

Despite the many varied prior art proposals made, none would appear to have made a continuous commercial process a practical reality in which yields of a mixture of useful oxidation products including cyclohexanol and cyclohexanone of the order of 75% and higher would be realizable consistently.

Hence, it is an object of the present invention to provide an economical commercial process for the oxidation of cyclohexane to a mixture of useful oxidation products, i.e., adipic acid precursors, including cyclohexanol and cyclohexanone at high yields previously unattainable on a commercial basis.

This object and others which will become apparent as the instant disclosure develops, can surprisingly be achieved by a process of staged partial oxidation of the cyclohexane in the liquid phase under conditions of simultaneous countercurrent stripping of unreacted cyclohexane from its reaction products by means of inert gas as hereinafter defined wherein the amount of oxygen contacted with a given amount of cyclohexane is controlled within prescribed limits.

The present invention provides a process for preparing partial oxidation products of cyclohexane, i.e., adipic acid precursors, which comprise contacting, at elevated temperature and pressure, a stream of liquid cyclohexane at each of several succesive stages of an oxidation zone with a mixture of gases including molecular oxygen at controlled partial pressure and inert gas; causing said mixture of gases to pass countercurrent to the stream of cyclohexane; and recovering the stream of cyclohexane containing partial oxidation products of cyclohexane from the last of said stages. More particularly, the present invention is conducted by contacting a stream of liquid cyclohexane maintained at a temperature in the range of 140–200° C. and at a pressure in the range of 50–350 p.s.i.g. at each of at least three successive oxidation stages. A mixture of gases comprising molecular oxygen and inert gas is introduced into each stage. The partial pressure of oxygen is maintained in the range 0.001 to 2 atm. The amount of oxygen introduced is controlled so that substantially all of the oxygen introduced into a given oxidation stage is consumed in that stage. The mixture of gases is passed countercurrent to the stream of cyclohexane in each stage and the inert gas passed countercurrent to the stream of cyclohexane through all preceding stages.

For a given pressure and temperature the partial pressure of oxygen $p(O_2)$ is calculated as the result of total input flow of oxygen multiplied by the pressure and divided by the total gaseous flow. Pressure units are expressed in atmospheres absolute and $p(O_2)$ will have to be calculated for the inlet gas composition to any stage in the oxidation zone after saturation with cyclohexane vapor and mixing with other gaseous species already present in the stage in question, and before any oxygen has reacted at that stage.

The concentration of oxygen in the liquid phase is fixed by the temperature and pressure in the oxidation zone, the rate of flow of the total mixture of gases through the oxidation stage, the composition of the gaseous stream, the mass transfer area between the liquid and gaseous phases, the catalyst concentration and the total liquid volume.

The useful partial oxidation products of cyclohexane, i.e., adipic acid precursors, which are the primary products of the process of the invention comprise cyclohexanol and cyclohexanone. Some cyclohexylhydroperoxide is also formed but any catalyst used prevents high levels by causing the hydroperoxide to decompose to primary products. Under the conditions of this process, conversion to by-products such as dicarboxylic and monocarboxylic acids is minimized.

While the inert gas is usually nitrogen, it may be any gas or vapor which cannot itself react with cyclohexane or its oxidation products or be substantially oxidized under the conditions of the oxidation reaction. Moreover, at least some inert gas entering the oxidation zone must be unsaturated with respect to cyclohexane and preferably be substantially unsaturated with respect to cyclohexane, so that liquid cyclohexane may evaporate and be transported by the inert gas as the inert gas passes from a later stage to an earlier stage (relative to the flow of liquid), and the concentration of the useful oxidation products within the remaining liquid cyclohexane in successive stages of the oxidation zone is increased in consequence.

Improved yields may be obtained according to the present invention by introducing inert gas at the last of the successive stages of the oxidation zone, after passing said inert gas through a heating zone contiguous with the oxidation zone.

One embodiment of this process comprises (1) causing a stream of liquid cyclohexane to flow from the oxidation zone via the heating zone to a stripping zone, (2) contacting, at elevated temperature and pressure, the stream of liquid cyclohexane at each of several immediately successive stages of the oxidation zone with a mixture of gases including oxygen at controlled partial pressure and inert gas and causing said inert gas to pass countercurrent to the stream of liquid cyclohexane, (3) vaporizing, in the heating zone, a portion of the liquid cyclohexane emerging from the oxidation zone and transporting said vaporized portion of cyclohexane countercurrent to the stream of liquid cyclohexane, (4) partially separating, in the stripping zone, the partial oxidation products of the cyclohexane from the stream of liquid cyclohexane emerging from the heating zone while continuously introducing inert gas into the stripping zone and passing said inert gas from the stripping zone through the oxidation zone countercurrent to the stream of liquid cyclohexane and its partial oxidation products and (5) recovering the partial oxidation products of the cyclohexane from the stripping zone.

Another embodiment comprises (1) causing the stream of liquid cyclohexane to flow from the preheating zone via the oxidation zone, the concentrating zone and the heating zone to the stripping zone, (2) contacting, in the preheating zone, at elevated pressure the stream of liquid cyclohexane with a gaseous stream including cyclohexane vapor and inert gas flowing countercurrent to the stream of liquid cyclohexane and being at a temperature in excess of that of the stream of liquid cyclohexane, (3) contacting, at elevated temperature and pressure, the stream of liquid cyclohexane at each of several immediately successive stages of the oxidation zone with a mixture of gases including oxygen at controlled partial pressure and inert gas and causing said inert gas to pass countercurrent to the stream of liquid cyclohexane, (4) contacting, in the concentration zone, in one or more stages, the stream of liquid cyclohexane emerging from the oxidation zone, with a stream of inert gas flowing countercurrent to the stream of liquid cyclohexane, (5) vaporizing, in the heating zone, a portion of the cyclohexane emerging from the concentrating zone and transporting said vaporized portion of cyclohexane countercurrent to the stream of liquid cyclohexane, (6) partially separating, in the stripping zone, the partial oxidation products of the cyclohexane from the stream of liquid cyclohexane emerging from the heating zone while continuously introducing inert gas into the stripping zone and passing said inert gas from the stripping zone countercurrent to the liquid stream of cyclohexane and its partial oxidation products and (7) recovering the partial oxidation products of the cyclohexane from the stripping zone.

In other embodiments, the oxidation zone is combined with the heating zone only or with the stripping zone only or with the concentrating and heating zones or with the preheating and stripping zones or the stripping may be carried out in separate apparatus.

One of the distinguishing features of the present process is defined by the parameters ratio of oxygen to liquid volume and by the average liquid residence time. The oxygen to volume ratio is the ratio of the volume of gaseous oxygen fed to each oxidation stage in standard cubic feet per hour to the gas-free liquid volume in cubic feet in the oxidation stage and is symbolized herein by $O/V$. The average liquid residence time is the average liquid residence time per oxidation stage and is determined for purposes of this application as the gas-free liquid volume for an oxidation stage divided by the rate at which the gas-free liquid stream is removed from the oxidation stage in cubic feet per minute. The average liquid residence time is symbolized herein as $\bar{T_r}$ (expressed in minutes). For the purposes of the present invention, the liquid flow rate through an oxidation stage is considered as the liquid flow rate from the oxidation zone. The flow from the oxidation zone is approximated by the liquid flow rate from the reactor (taken as 39 lbs. of liquid/cubic foot) and is reported in this manner in the examples. This approximation is satisfactory except for the case where a stripping zone is employed to vaporize a substantial portion of the liquid effluent from the oxidation zone in which case the actual liquid flow from the oxidation zone must be measured. Gas-free liquid volume is determined by measuring the height of liquid remaining on a tray immediately after all gas flow to or through the tray is stopped and multiplying this number by the internal cross-sectional area of the tray and in the case where the oxidation stage comprises more than one tray the gas-free liquid volume is the sum of the volume of each tray in the oxidation stage.

Oxygen having its partial pressure reduced to within the range of from 0.001 to 2.0 atm. is referred to herein as oxygen at controlled partial pressure. The controlled partial pressure of oxygen, when practicing the process of the present invention, will preferably be within the range of from 0.005 to 1.5 atm. and optionally be between 0.01 to 1.0 atm.

Consideration must be given at all times to operating the process of the present invention at such controlled partial pressures of oxygen which are outside the explosive range when the oxygen is present in admixture with nitrogen or inert gas saturated with hydrocarbon vapors.

As mentioned hereinbefore, the process of the present invention may in various embodiments be practiced by utilizing the oxidation zone in combination with one or more other zones. The economics of the process of the present invention may dictate the use of all five zones. Nonetheless, under certain operating conditions certain of these zones become marginal only in value and acceptable yields may be realized without their use; for example, if the liquid cyclohexane to be used in the process of the present invention is at a sufficiently high temperature, there will be no need to utilize a preheating zone; the liquid cyclohexane would then enter the oxidation zone directly and a yield of the order of 75% or higher could still be realized at an acceptable concentration of the useful partial oxidation products within the stream of the liquid cyclohexane leaving the system.

If zones in addition to the oxidation zone are utilized according to the present invention, such zones may be distinctly separate zones, or two or more zones may be combined. It is usually desirable that all zones are combined in such a way that they can be contained within one reactor shell defining such zones in a contiguous relationship.

In those embodiments of the present invention in which a preheating zone is provided, the preheating zone should comprise at least one and preferably from three to eight successive stages in each of which the stream of liquid cyclohexane may be contacted with a gaseous stream including cyclohexane vapor and inert gas emerging from the oxidation zone and flowing countercurrent to the stream of liquid cyclohexane. This gaseous stream must be at a temperature in excess of that of the stream of liquid cyclohexane so that the temperature of the latter stream can be increased by contact with the gaseous stream.

The oxidation zone must be arranged in such a way that several successive stages are provided at each of which successive stages the stream of cyclohexane can be contacted with oxygen. At least three such successive stages will be required and from five to thirty such successive stages will usually be considered adequate for practicing the process of the present invention. Mainly considerations relative to the size of the total reactor place restrictions upon the maximum number of such successive stages within the oxidation zone. It will be understood that the concentration of partial oxidation products of cyclohexane within the stream of cyclohexane in general increases at each such successive stage.

Following the oxidation zone, there may be provided a concentrating zone. The concentrating zone, which need not be present for practicing the process of this invention, would advantageously comprise at least two stages and preferably up to four stages. Each stage should be adapted in such a way that the concentration of the useful partial oxidation products of the cyclohexane within the stream of liquid cyclohexane can be increased by vaporization of liquid cyclohexane. Plates, trays, or packed sections known in the art will be useful in defining such suitable stages. If a concentrating zone is provided, it is preferred to provide also a heating zone following the concentrating zone.

The heating zone may itself be equipped with heating means such as steam coils, to supply the heat necessary to vaporize a portion, for example, from 20–80% by weight, of cyclohexane remaining within the stream of cyclohexane emerging from the oxidation zone. As an alternative, the stream of cyclohexane arriving from the oxidation zone may be withdrawn within the heating zone and passed through a heater before returning the stream to the heating zone, where vaporization is effected. In this connection it should be noted that cyclohexane is more volatile than its commercially valuable partial oxidation products. It is most desirable that in designing the heating zone provisions be made for the latter to be in a contiguous relationship with its preceding zone to facilitate free flow of the stream of liquid cyclohexane to the heating zone and free of cyclohexane vapor in the reverse direction. The heating zone will thus normally be in contiguous relationship with the concentrating zone, although in the absence of the latter it may be in contiguous relationship with the oxidizing zone.

The last zone, namely the stripping zone, performs the function of a "stripper-cooler"; in it, further cyclohexane is separated from the liquid medium containing the useful partial oxidation products. This separation is accomplished by vaporizing cyclohexane with a stream of inert gas forced into this zone at a point remote from the preceding zone. The heat required to evaporate the liquid cyclohexane is obtained from the cooling of that portion of the liquids which does not evaporate. After the separation in the stripping zone, the useful partial oxidation products admixed with cyclohexane and impurities leave the reactor to be cooled further and stored, or to be processed further immediately.

The insert gas which is forced into the stripping zone may be any gas or vapor which cannot itself react with cyclohexane or its oxidation products or be oxidized to any extent under the conditions prevailing in the stripping zone. It is preferably nitrogen, but may optionally be the so-called "reactor off-gases" emanating from the process of the present invention, that is, the gases and vapors escaping from the first zone which, therefore, may contain some unreacted oxygen.

It will be appreciated that the process of the present invention may be carried out in any type of multi-staged countercurrent vapor-liquid contacting device such as in stirred autoclaves, tower reactors or tubular reactors. Best results, from the standpoint of economics, are obtained when the process of the present invention is carried out in a staged tower reactor. Such a staged tower reactor may contain within the reactor shell the various zones, all in contiguous relationship, and each such zone may itself be sub-divided by a series of stages. Suitable arrangements therefore will be described hereinafter.

If desired, the process of the present invention may be carried out in the absence of added catalyst. However, it has been found that higher yields of cyclohexanol and cyclohexanone are obtained if at least a small quantity of catalyst is added to the cyclohexane feed stream. The quantity of catalyst may be extremely small; for example, as little as 0.1 part per million of cobalt by weight as the metal based upon the liquid in the form of a hydrocarbon-soluble compound has been found effective. In place of the cobalt compound, other catalysts may be used and these include hydrocarbon soluble compounds of copper, cerium, vanadium, chromium and manganese. However, the hydrocarbon-soluble compounds of cobalt are preferred and would normally be used in quantities of from 0.1 to 50 parts per million.

It may be advantageous, when practicing the process of the present invention, to inject any catalyst to be used into the stream of cyclohexane at 2 or more separate stages within the oxidation zone although, as an alternative, the stream of cyclohexane entering the oxidation zone may contain all of any catalyst to be used.

The process of the present invention is practiced by contacting the stream of cyclohexane optionally containing an added catalyst, in the oxidation zone at successive stages at a temperature within the oxidation zone between about 140 to 200° C. and preferably between 155 and 185° C., and at a pressure between 50 and 350 lbs. per square inch absolute, and preferably from 110 to 240 lbs. per square inch absolute. The process of the present invention is conducted with $O/V$ less than about 60 hr.$^{-1}$ and with $\overline{Tr}$ of less than about 8 minutes. It is preferred to conduct the present process with $O/V$ in the range 2.9 to 60 hr.$^{-1}$ and with $Tr$ in the range 0.54 to 5.3 minutes as illustrated in the examples. Under such operating conditions the yield of cyclohexanol, cyclohexanone and CHHP according to the process of the present invention ranges from about 70 to 90% or more based upon the quantity of cyclohexane consumed, and the total yield of partial oxidation products which may be converted to adipic acid upon further oxidation is higher still.

When using air as the source of $O_2$ the process of this invention may be operated over a range of air flow rates such that the air to volume ratio, $A/V$ ($A/V = O/V/.21$), is in the range 14–286 hr.$^{-1}$ corresponding to an $O/V$ of 2.9–60 hr.$^{-1}$.

For further oxidation to adipic acid the partial oxidation products leaving the last zone of the reactor may be worked up by the so-called "wet KA" process which is disclosed in Canadian Pat. No. 546,287 by Goldbeck and Johnson. According to this "wet KA" process, the partial oxidation products to be conducted to a nitric acid oxidizer for the production of adipic acid should be an oil distillate obtained by injecting water into the partial oxidation products leaving the reactor; hydrocarbon and aqueous phases are then separated from the resulting mixtures, steam-distillable oil is removed from said aqueous phase, said oil is added to the hydrocarbon phase, substantially all of the hydrocarbon is stripped from the resulting mixture, and the resulting residue is exhaustively steam distilled whereupon a suitable oxidizable feed for the nitric acid oxidizer is obtained. The presence of water is advantageous during the recovery of cyclohexane from the partial oxidation products because it suppresses dehydration of cyclohexanol and cyclohexanone to such products as cyclohexylidene cyclohexanone, cyclohexyl ethers and cyclohexyl esters.

A more complete understanding of the process of the present invention will be obtained by reference to the accompanying drawings.

FIG. 1 of the drawings illustrates diagrammatically a flow sheet of the process;

FIG. 2 of the drawings is a sectional diagram of the reactor outlined in FIG. 1;

FIG. 3 of the drawings illustrates diagrammatically an alternate flow sheet of the process;

FIG. 4 is a sectional diagram of a reactor useful for practicing the alternative process illustrated in FIG. 3;

FIG. 5 is a sectional diagram of a reactor having no heating zone;

Figure 1:
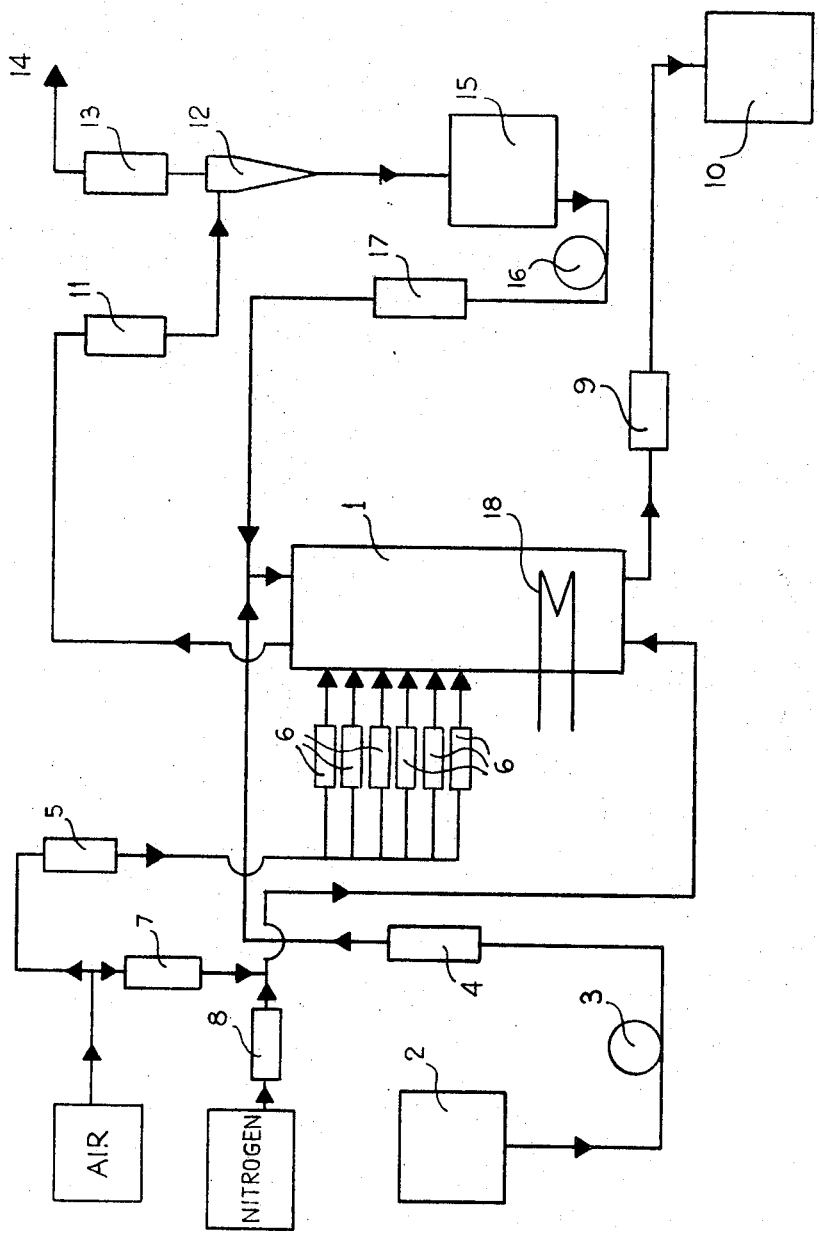
Figure 3:
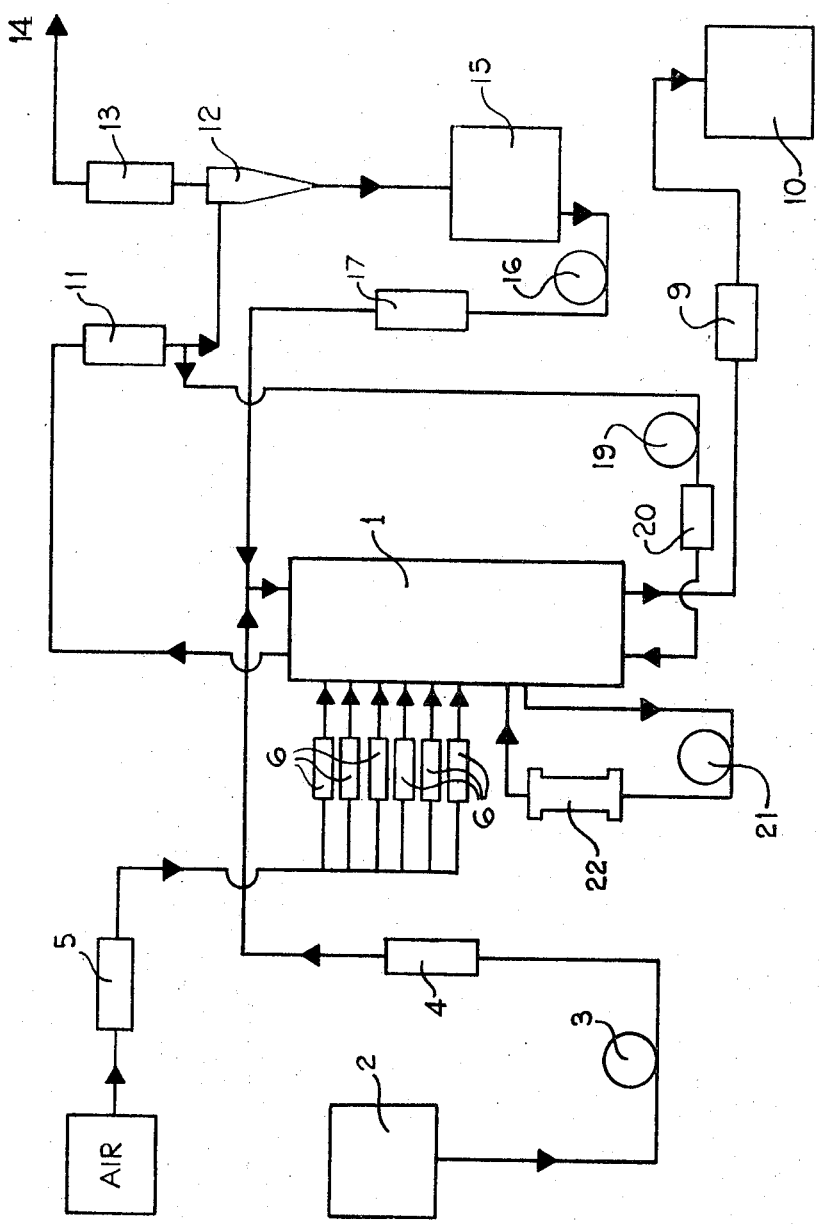
Figure 6:
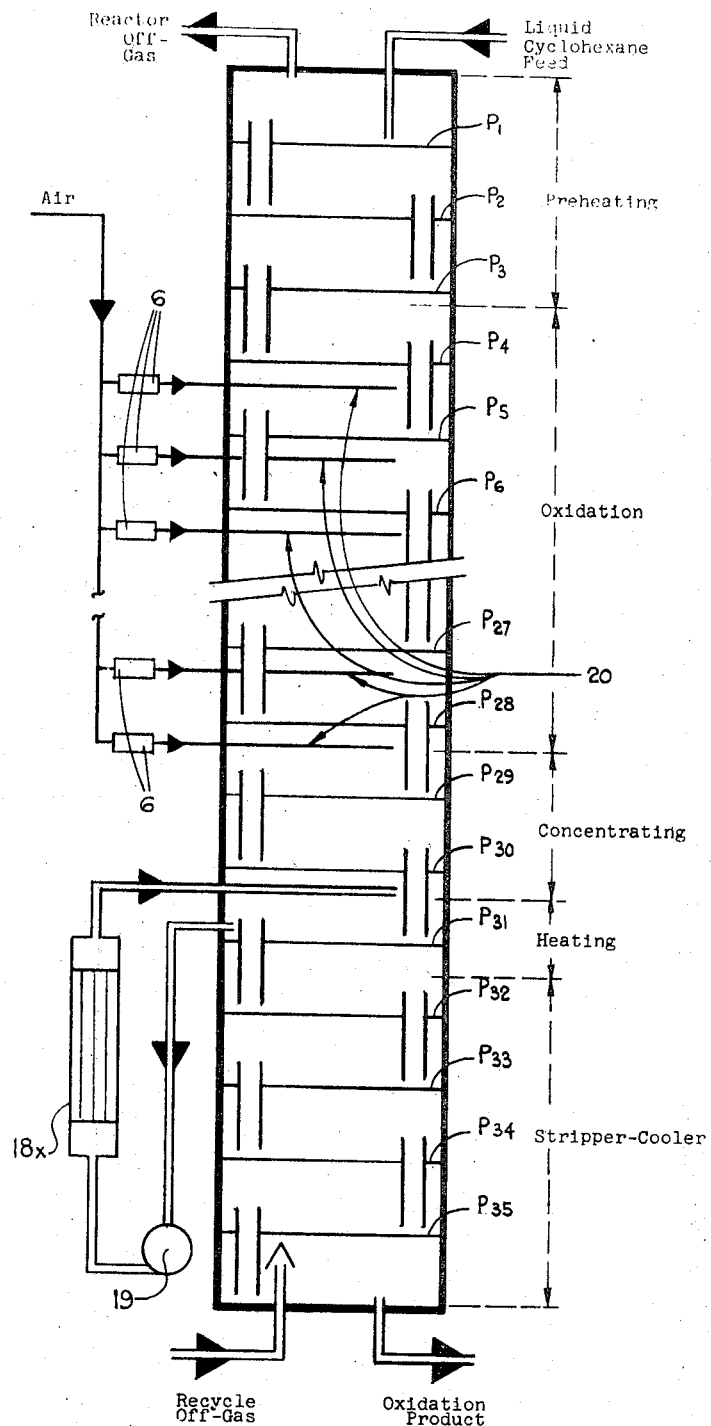

FIG. 6 of the drawings illustrates in detailed section yet a further possible design for the reactor outlined in FIGS. 1 and 3;

FIG. 7 of the drawings illustrates diagrammatically another alternate flow sheet of the process.

Figure 10A:
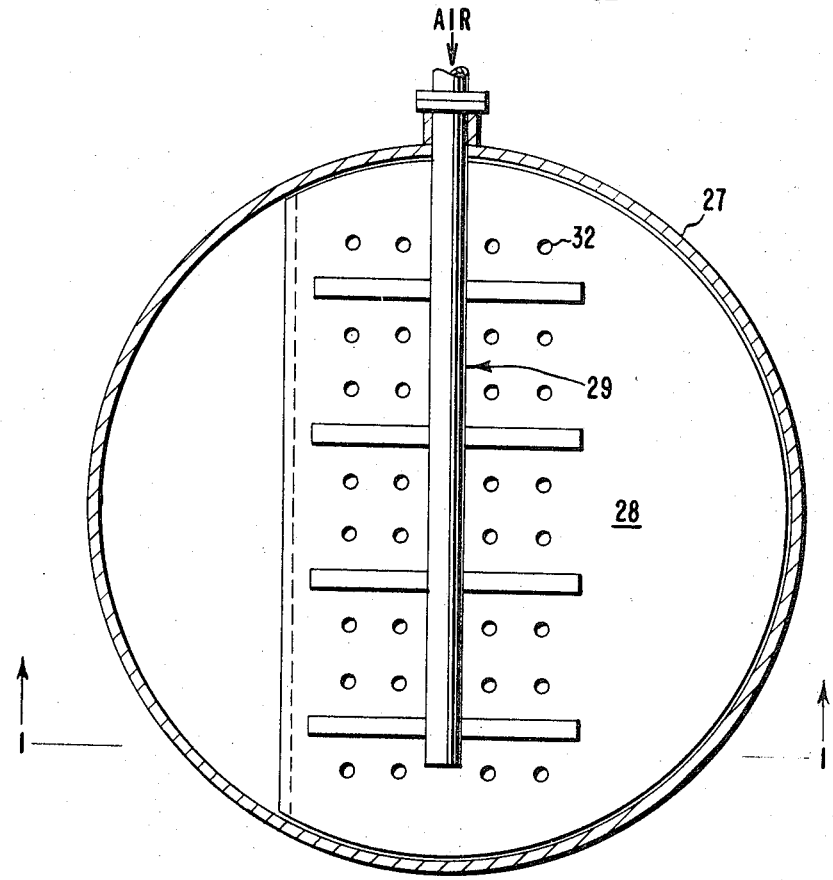
Figure 10B:
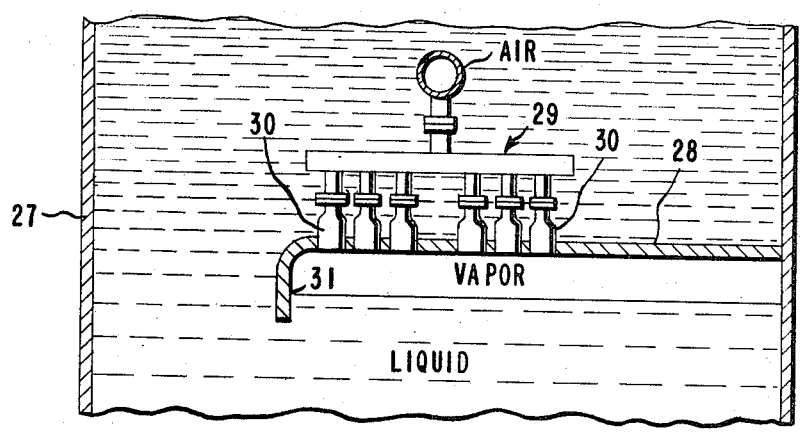

FIG. 8 is a sectional diagram of a reactor useful for practicing the alternative process illustrated in FIG. 7 in which the reactor is operated as flooded plate column;

FIG. 9 is a schematic representation of a modification of the reactor of FIG. 8 in which the preheating zone comprises only one plate and the stripping zone has no plates but does have inert gas distribution means;

FIG. 10A is a horizontal plan view of one plate in the oxidation zone of FIGS. 8 or 9; and FIG. 10B is a vertical section corresponding to the plate of FIG. 10A giving details of a suitable air distribution means.

Referring now to FIG. 1 of the accompanying drawings, the process of the present invention is carried out in reactor 1 having an internal diameter of 4.26 inches which is constructed in such a way that liquids flow countercurrent to gases in that the gases flow in an upward direction and the liquids down. Within reactor 1 are four zones, namely, a first zone in the upper part functioning as the oxidation zone, followed by a second zone, lower down the reactor functioning as the concentrating zone, a third zone functioning as the heating zone and lastly a fourth zone at the base of the reactor functioning as the stripper-cooler. Cyclohexane containing from about 1 to 10 p.p.m. of a hydrocarbon-soluble salt of cobalt is directed from storage tank 2 by means of pump 3 via a heater 4 to the top of reactor 1. Air is metered through a flowmeter 5 and enters the oxidation zone of reactor 1 at different stages via meters 6. The amount of air entering at the different stages of the oxidation zone is predetermined to control the partial pressure of oxygen. The air rates may be varied from stage to stage as desired.

The inert gas entering the stripper-cooler portion of reactor 1 may contain small amounts of oxygen which may be controlled by metering air through flowmeter 7. The main portion of inert gas entering the stripper-cooler is nitrogen which is metered through flowmeter 8. The desired operating temperature of reactor 1 may be adjusted by regulating the temperature within the heating zone of the reactor or alternatively by adjusting the temperature of the cyclohexane feed entering the top of the reactor 1 by means of heaters 4 and 17. Within the oxidation zone of reactor 1, the temperature profile does not tend to fluctuate when operating conditions are selected in such a manner that the heat given out in the reaction closely balances the heat required to saturate the inert gas at the various stages with cyclohexane vapor.

The partial oxidation products leaving the stripper-cooler zone of reactor 1 are cooled further in heat exchanger 9 and are then directed to a storage tank 10. The inert gas enters the stripper-cooler zone at relatively low temperature. In the stripper-cooler zone the inert gas containing some oxygen is saturated with cyclohexane vapor. The heat required to evaporate the cyclohexane is supplied from the heat content of the liquid stream flowing down the zone thereby cooling the stream. Most of this heat transfer and stripping process is carried out at temperatures insufficiently high to promote further oxidation.

The reactor off-gases which comprise primarily nitrogen and cyclohexane vapor are directed to cooler-condenser 11 in which the major part of the condensible components of the off-gases is condensed. The gaseous matter emerging from cooler-condenser 11 is passed through a liquid gas separator 12 and then through a second cooler-condenser 13. The gases from cooler-condenser 13 are passed through a pressure control valve (not shown) and discharged to the atmosphere through conduit 14 or alternatively they may be conducted directly from separator 12 to a scrubbing system (not shown in FIG. 1) where the remainder of the cyclohexane vapor may be removed. The condensed vapors from separator 12 are then directed to storage tank 15 and by means of pump 16 are returned to the top of the reactor 1 via heater 17.

Heat within reactor 1 is supplied by a steam coil or steam coils 18 placed inside the heating zone of reactor 1 (on top of the plates defining the various stages of the heating zone).

Figure 2:
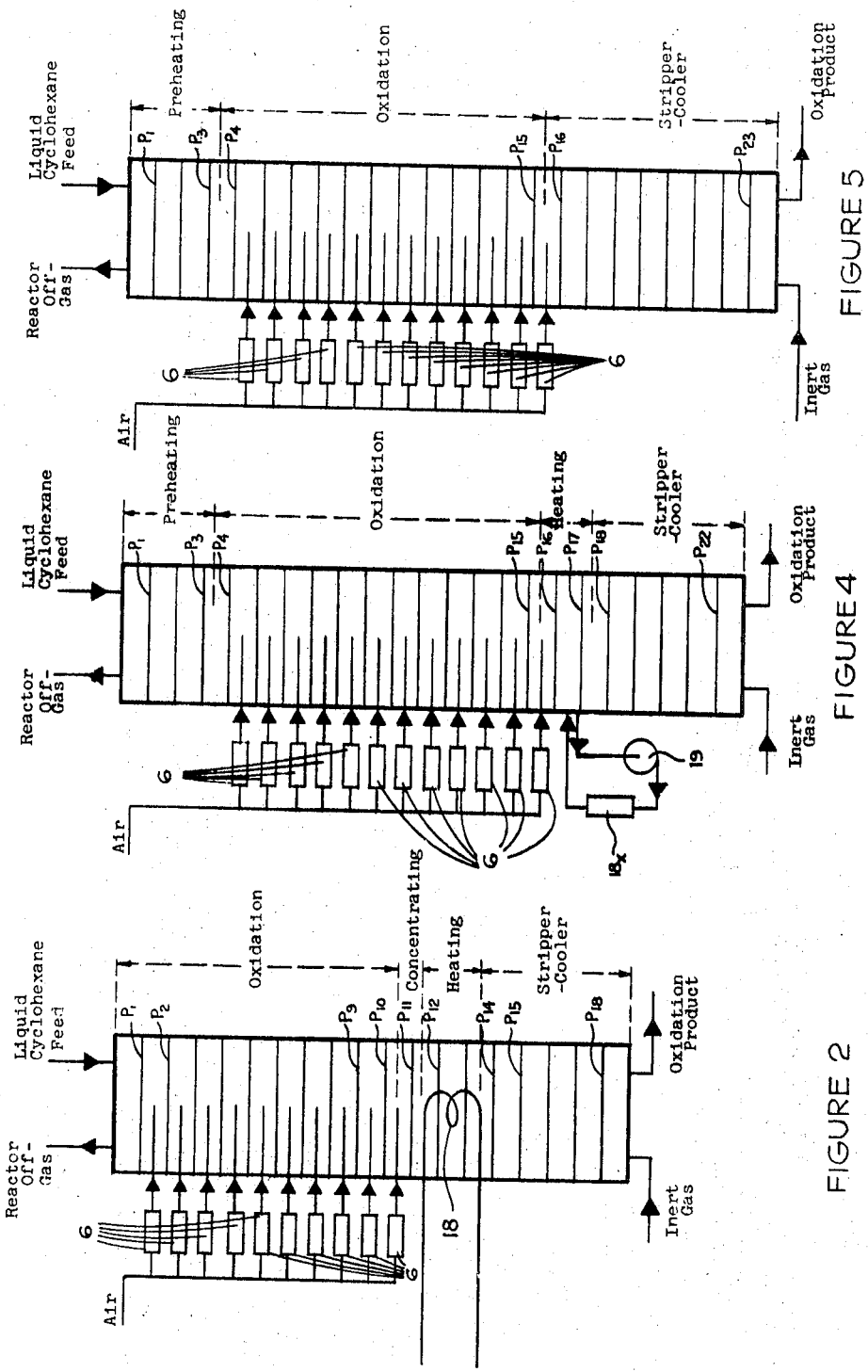

The internal arrangement of reactor 1 is illustrated in greater detail in FIG. 2 of the drawings. A series of stages, namely, plates or trays P, are appropriately arranged in sequence within the reactor housing which may be made of any suitable material such as stainless steel 304L. The oxidation zone of reactor 1 is defined by the region occupied by plates or trays $P_1$ to $P_{10}$. Plate or tray $P_{11}$ defines the concentrating zone. Above plates or trays $P_{12}$ to $P_{14}$ are situated heating coils 18, so that the region between plate or tray $P_{11}$ and $P_{14}$ constitutes the heating zone. The remaining plates or trays $P_{15}$ to $P_{18}$ define the stripper-cooler zone. Below each plate or tray $P_1$ to $P_{10}$ in the oxidation zone are outlets for discharging gases containing oxygen at controlled partial pressure. These outlets may conveniently be formed by one or more perforated pipes projecting from meters 6 into reactor 1 beneath each plate or tray $P_1$ to $P_{10}$.

Cyclohexane and any added catalyst enters reactor 1 above plate or tray $P_1$ and the partial oxidation products of cyclohexane leave reactor 1 below plate or tray $P_{18}$. Inert gas flows countercurrent in that it is introduced below plate or tray $P_{18}$ and escapes from reactor 1 above plate or tray $P_1$.

Examples of actual operating runs carried out by the procedure outlined above and in apparatus illustrated in FIGS. 1 and 2 of the drawings are set forth in Table 1 and Table 2 hereinafter.

TABLE 1

| Run No. | Average reaction zone temperature, °C. | Reactor pressure, lb./sq. in. ga. | Total air flow to reaction zone, std. cu. ft./hr. | Total $N_2$ and air flow to bottom of stripper-cooler, std. cu. ft./hr. | Percent $O_2$ in gas flow to the bottom of stripper-cooler | Total liquid flow to the column, fresh feed and condensed vapor, lb./hr. | Liquid flow from the stripper-cooler, lb./hr. | Catalyst conc., p.p.m. cobalt | Calculated partial pressure range in reaction zone, atms. abs. | Conc. of Cyclohexanone plus cyclohexanol plus CHHP in flow leaving the stripper cooler section, percent | Conc. of cyclohexanone plus cyclohexanol in column reactor condensed vapor, percent |
|---|---|---|---|---|---|---|---|---|---|---|---|
| 77 | 168 | 180 | 30 | 120.0 | 1.93 | 83.9 | 19.2 | 3.0 | .117–.127 | 5.86 | .110 |
| 83 | 165 | 150 | 30 | 100.0 | 1.05 | 101.7 | 24.4 | 3.0 | .060–.070 | 3.60 | .082 |
| 96 | 161 | 130 | 30 | 40.6 | 5.42 | 118.0 | 9.0 | 3.0 | .156–.224 | 7.59 | .089 |
| 109 | 167 | 150 | 30 | 60.0 | 1.75 | 105.5 | 22.3 | 3.0 | .082–.095 | 5.49 | .097 |
| 112 | 165 | 150 | 30 | 60.0 | 1.75 | 85.0 | 26.9 | 3.0 | .090–.116 | 5.06 | .105 |
| 113 | 165 | 150 | 30 | 99.3 | 1.86 | 100.1 | 25.5 | 3.0 | .086–.101 | 6.02 | .088 |
| 114 | 165 | 150 | 30 | 99.3 | 1.86 | 99.7 | 23.2 | 3.0 | .072–.133 | 6.24 | .093 |

| Run No. | Air flow/location to reaction zone stages, std. cu. ft./hr. | Liquid level at each reaction zone, inches | Cyclohexane feed, percent cyclohexane | Yield to cyclohexanone plus cyclohexanol plus CHHP based on cyclohexane reacted, percent (1) | Yield to esters based on cyclohexane reacted, percent (2) | Total yield (1) plus (2), percent | Yield to cyclohexanone plus cyclohexanol plus CHHP at similar conditions in a conventional single stage stirred oxidizer, percent | Gas-free liquid volume per oxidation stage, cu. ft. | Average liquid residence time per oxidation stage Tr, min. | Total air feed total gas-free liquid volume in oxidation stage (A/V), std. cu. ft./hr./cu. ft. | Ratio of oxygen/gas-free liquid volume in oxidation stage (O/V), std. cu. ft. hr./cu. ft. |
|---|---|---|---|---|---|---|---|---|---|---|---|
| 77 | (¹) | 1½ | 99.5 | 84.24 | 0.10 | 84.34 | 66 | .0105 | 1.3 | 286 | 60 |
| 83 | do.¹ | 1½ | 99.5 | 87.23 | 0.10 | 87.33 | 70 | .0105 | 1.0 | 286 | 60 |
| 96 | do.¹ | 1½ | 99.5 | 74.51 | ----- | 74.51 | 64 | .0105 | 2.7 | 286 | 60 |
| 109 | (²) | 2½ | 99.5 | 84.17 | .58 | 84.75 | 66 | .0175 | 1.8 | 171 | 36 |
| 112 | (³) | 2½ | 99.5 | 84.25 | .57 | 84.82 | 67 | .0175 | 3.0 | 171 | 36 |
| 113 | do.³ | 2½ | 99.5 | 87.73 | .72 | 88.45 | 66 | .0175 | 3.2 | 171 | 36 |
| 114 | (⁴) | 2½ | 99.5 | 87.40 | .59 | 87.99 | 66 | .0175 | (⁵) | 171 | (⁶) |

¹ 3 std. cu. ft./hr. for each stage.
² 3 std. cu. feet each stage.
³ 6 std. cu. ft. every second stage.
⁴ Varying air flow:

| Stage | Std. cu. ft./hr. |
|---|---|
| 1st | 10 |
| 4th | 8 |
| 7th | 8 |
| 9th | 4 |

⁵ Stage Tr

| Stage | Tr |
|---|---|
| 1st | 1.8 |
| 4th | 5.3 |
| 7th | 5.3 |
| 9th | 3.5 |

⁶ Stage O/V

| Stage | O/V |
|---|---|
| 1st | 120 |
| 4th | 32 |
| 7th | 32 |
| 9th | 24 |

Note.—S.c.f.h. measured at about 0° C. atmosphere.

TABLE 2.—YIELD (PERCENT) FROM CYCLOHEXANE TO—

| Run No. | Cyclo-hexanone | Cyclo-hexanol | CHHP | Free and combined adipic acid | Hydroxy-caproic acid | Cyclo-hexyl formate | Cyclo-hexyl acetate | Cyclo-hexyl propionate | Cyclo-hexyl butyrate |
|---|---|---|---|---|---|---|---|---|---|
| 77  | 32.98 | 45.78 | 5.47 | 1.25 | .69  | 1.36 |     |     | 0 |
| 83  | 33.95 | 47.74 | 5.53 | 1.23 | 1.36 |     |     |     | 0 |
| 96  | 27.77 | 42.67 | 4.07 |     |     |     |     |     |     |
| 109 | 35.29 | 44.92 | 3.96 | 0.77 | .85  |     |     |     | .39 |
| 112 | 32.94 | 46.30 | 4.99 | 1.32 | 1.46 |     |     |     | .40 |
| 113 | 33.90 | 47.86 | 5.97 | 1.17 | 1.29 | .11 | 0   |     | .44 |
| 114 | 34.55 | 46.87 | 5.97 | .82  | .91  |     |     |     | .45 |

| Run No. | Cyclo-hexyl valerate | Cyclo-hexyl caproate | Propionic acid | Butyric acid | Valeric acid | Caproic acid | CO | $CO_2$ | Total percent cyclohexane accounted for |
|---|---|---|---|---|---|---|---|---|---|
| 77  | .11 | 0 | .67 | .53 | 2.39 | .74 | 1.67 | .81  | 93.09 |
| 83  | .10 | 0 | .59 | .52 | 1.67 | .60 | 1.32 | 1.10 | 95.72 |
| 96  |     |   |     |     |      |     | 1.31 | 2.22 |       |
| 109 | .19 | 0 | .53 | .32 | 2.90 | .76 | 1.95 | .66  | 93.50 |
| 112 | .17 | 0 | .42 | .32 | 3.03 | .77 | 1.73 | .61  | 94.47 |
| 113 | .17 | 0 | .31 | .35 | 2.85 | .60 | 1.67 | .75  | 97.46 |
| 114 | .13 | 0 | .46 | .37 | 2.67 | .63 | 1.63 | .66  | 96.14 |

FIG. 3 of the accompanying drawings is a flow sheet of an embodiment of the process of the present invention in which the inert gas flow is obtained by circulating a portion of the gases or vapors leaving cooler-condenser 25 11 through a recirculating pump 19 and metering this flow through flowmeter 20.

Reactor 1 having the same internal diameter as that of the foregoing examples is again constructed in such a way that liquids flow countercurrent to gases. Within reactor 1 are five zones. The first zone, in the top portion of the reactor, functions as the preheating zone followed, in descending order, by the second zone of reactor 1 which is the oxidation zone; the third zone which is the concentrating zone; the fourth zone which is the heating zone, and, lastly, the fifth zone which is the stripping or stripper-cooler zone.

The presence of the preheating zone in reactor 1 helps to reduce or eliminate the need for heating cyclohexane coming from condensed vapor storage 15 and cyclohexane storage tank 2.

The inert gas entering the stripper-cooler zone of reactor 1 may contain some cyclohexane and other low boiling material in amounts controlled by vapor-liquid relationships in the top zone of reactor 1 and in the gas recirculation system. In the fourth, that is, the heating zone of reactor 1, heating is accomplished by pumping a stream of liquid cyclohexane from the reactor through circulating pump 21 and a heater 22 before returning the stream to the reactor. The particular arrangement employed is illustrated in greater detail in FIG. 4.

Examples of actual operating runs carried out by the procedure outlined above and in apparatus illustrated in FIGS. 3 and 4 of the drawings are set forth in Table 3 and Table 4 hereinafter.

TABLE 3

| Run No. | Average reaction zone temp., °C. | Reactor pressure, lb./sq. in. ga. | Total air flow to reaction zone, std. cu. ft./hr. | Recirculation off-gas flow, std. cu. ft./hr. | Total liquid flow to the column, feed and condensed vapor, lb./hr. | Liquid flow from stripper-cooler section, lb./hr. | Catalyst conc. p.p.m. cobalt (based on product flow) | Calculated partial pressure range in reaction zone, atm. abs. |
|---|---|---|---|---|---|---|---|---|
| 360 | 170 | 180 | 43 | 170 | 130.4 | 44.4  | 8.0   | .0680–.0818 |
| 361 | 170 | 180 | 43 | 170 | 134.6 | 51.5  | 8.0   | .0680–.0841 |
| 362 | 170 | 180 | 43 | 170 | 136.9 | 49.2  | 8.0   | .0655–.0799 |
| 400 | 170 | 180 | 46 | 170 | 129.4 | 40.0  | 5.0   | .0470–.0515 |
| 401 | 170 | 180 | 46 | 170 | 133.7 | 45.4  | 5.0   | .0477–.0527 |
| 402 | 170 | 180 | 46 | 170 | 132.3 | 40.0  | 5.0   | .0478–.0544 |
| 500 | 174 | 150 | 41 | 120 | 130.8 | 120.8 | ¹ 5.0 | .0345–.0453 |
| 501 | 174 | 150 | 41 | 120 | 129.8 | 118.1 | ¹ 5.0 | .0451–.0549 |
| 502 | 174 | 150 | 41 | 120 | 129.6 | 119.5 | ¹ 5.0 | .0306–.0383 |
| 510 | 160 | 180 | 41 | 325 | 131.8 | 118.2 | ¹ 5.0 | .0871–.1100 |
| 511 | 160 | 180 | 41 | 325 | 134.5 | 119.3 | ¹ 5.0 | .0895–.1038 |
| 512 | 160 | 180 | 41 | 325 | 134.3 | 118.4 | ¹ 5.0 | .0908–.1015 |
| 513 | 160 | 180 | 41 | 325 | 135.3 | 120.2 | ¹ 5.0 | .1010–.1120 |

| Run No. | Oxygen partial pressure calculated from gas analysis (atm. abs.) Below plate No. | Oxygen partial pressure | Conc. of cyclohexanone plus cyclohexanol plus CHHP in product leaving stripper-cooler zone, percent | Conc. of cyclohexanone plus cyclohexanol in column reactor condensed vapor, percent | Air flow to reaction zone at indicated stage (Std. cu. ft./hr.) Stage | Flow | Cyclohexane feed composition, percent | Liquid level at each oxidation zone stage, in. |
|---|---|---|---|---|---|---|---|---|
| 360 | 13 | 0.0427 | 3.96 | 0.045 | 1 | 2.7 | 99.5 | 4 |
| 361 | 13 | 0.0448 | 3.74 | 0.060 | 2 | 5.2 | 99.5 | 4 |
| 362 | 13 | 0.0463 | 3.92 | 0.059 | 3–11 | 3.9 | 99.5 | 4 |
| 400 | 13 | 0.0617 | 4.63 | 0.088 | 1 | 2.2 | (²) | 4 |
| 401 |    |        | 4.37 | 0.118 | 3–10 | 4.4 | (²) | 4 |
| 402 | 13 | 0.0572 | 4.72 | 0.111 | 2 | 5.2 |     | 4 |
|     |    |        |      |       | 11 | 3.5 |     |   |
| 500 |    |        | 1.64 | 0.070 |      |     |     | 4 |
| 501 |    |        | 1.67 | 0.074 | 1–12 | 3.4 | (²) | 4 |
| 502 | 15 | 0.0264 | 1.71 | 0.072 |      |     |     | 4 |
| 510 |    |        | 1.66 | 0.018 |      |     |     | 4 |
| 511 |    |        | 1.55 | 0.019 | 1–12 | 3.4 | (²) | 4 |
| 512 |    |        | 1.58 | 0.018 |      |     |     | 4 |
| 513 | 15 | 0.0815 | 1.58 | 0.007 |      |     |     | 4 |

TABLE 3—Continued

| Run No. | Yield to cyclohexanone plus cyclohexanol plus CHHP based on cyclohexane reacted (1), percent | Yield to esters based on cyclohexane reacted (2), percent | Total yield (1) and (2), percent | Yield to cyclohexanone plus cyclohexanol plus CHHP at similar condition in single stage stirred oxidizer, percent | Gas-free liquid volume per oxidation stage, cu. ft. | Average liquid residence time per oxidation stage (Tr), min. | Total air feed/total gas-free liquid volume in oxidation stage (A/V), std. cu. ft./hr./cu. ft. | Ratio of oxygen/gas-free liquid volume in oxidation stage (O/V), std. cu. ft./hr./cu. ft. |
|---|---|---|---|---|---|---|---|---|
| 360 | 84.31 | .80 | 85.11 | 69 | .028 | 1.5 | 140 | [3] 20 |
| 361 | 86.60 | .78 | 87.38 | 70 | .028 | 1.3 | 140 | [4] 39 |
| 362 | 86.88 | .77 | 87.65 | 69 | .028 | 1.4 | 140 | [5] 29 |
| 400 | 82.99 | 1.23 | 84.22 | 68 | .028 | 1.7 | 149 | [3] 16 |
| 401 | 82.27 | 1.05 | 83.32 | 69 | .028 | 1.4 | 149 | [6] 33 [4] 39 |
| 402 | 81.31 | 1.32 | 82.63 | 68 | .028 | 1.7 | 149 | [7] 27 |
| 500 | 90.96 | 1.15 | 92.11 | 79 | .028 | .54 | 122 | 26 |
| 501 | 91.89 | 1.32 | 93.21 | 79 | .028 | .55 | 122 | 26 |
| 502 | 88.40 | 1.77 | 90.17 | 79 | .028 | .55 | 122 | 26 |
| 510 | 88.91 | 1.30 | 90.21 | 79 | .028 | .55 | 122 | 26 |
| 511 | 89.00 | 1.00 | 90.00 | 79 | .028 | .55 | 122 | 26 |
| 512 | 88.87 | 2.04 | 90.91 | 79 | .028 | .55 | 122 | 26 |
| 513 | 88.25 | .32 | 88.57 | 79 | .028 | .54 | 122 | 26 |

[1] Catalyst injected in three locations.
[2] Contains 0.2–0.3 K+A+CHHP.
[3] Stage 1.
[4] Stage 2.
[5] Stages 3–11.
[6] Stages 3–10.
[7] Stage 11.

NOTE.—S.c.f.h. measured at about 0° C. and 1 atmosphere.

TABLE 4.—YIELD PERCENT FROM CYCLOHEXANE TO—

| Run No. | Cyclohexanone | Cyclohexanol | CHHP | Free and combined adipic acid | Hydroxycaproic acid | Cyclohexyl formate | Cyclohexyl acetate | Cyclohexyl propionate | Cyclohexyl butyrate |
|---|---|---|---|---|---|---|---|---|---|
| 360 | 35.48 | 45.64 | 3.19 | .80 | .88 | .17 | 0 | | .33 |
| 361 | 35.43 | 48.14 | 3.02 | .87 | .96 | .19 | 0 | | .32 |
| 362 | 35.16 | 48.77 | 2.95 | .83 | .92 | .16 | 0 | | .37 |
| 400 | 32.86 | 47.56 | 2.56 | .58 | .64 | .20 | 0 | | .40 |
| 401 | 32.18 | 46.66 | 3.44 | .68 | .75 | .18 | 0 | | .39 |
| 402 | 32.33 | 46.05 | 2.93 | .63 | .69 | .25 | 0 | | .45 |
| 500 | 35.07 | 50.92 | 4.96 | 1.64 | 1.82 | .12 | 0 | | .57 |
| 501 | 35.26 | 52.23 | 4.39 | .90 | .99 | .12 | 0 | | .56 |
| 502 | 33.36 | 50.99 | 4.05 | .62 | .68 | .16 | 0 | | .65 |
| 510 | 35.79 | 45.64 | 7.49 | 1.33 | 1.47 | .11 | 0 | | .37 |
| 511 | 35.83 | 45.52 | 7.65 | 1.35 | 1.49 | .12 | 0 | | .40 |
| 512 | 35.83 | 44.09 | 7.57 | 1.16 | 1.28 | .18 | 0 | | .39 |
| 513 | 36.49 | 44.21 | 7.55 | 1.06 | 1.18 | | | | .32 |

| Run No. | Cyclohexyl valerate | Cyclohexyl caproate | Propionic acid | Butyric acid | Valeric acid | Caproic acid | CO | CO$_2$ | Total percent cyclohexane accounted for |
|---|---|---|---|---|---|---|---|---|---|
| 360 | .17 | .13 | .07 | .43 | 2.65 | .47 | 1.77 | .39 | 92.58 |
| 361 | .14 | .14 | .06 | .45 | 2.77 | .46 | 1.78 | .38 | 93.29 |
| 362 | .13 | .11 | .07 | .47 | 2.89 | .47 | 1.99 | .39 | 94.00 |
| 400 | .24 | .38 | .09 | .67 | 3.30 | .66 | 3.45 | .49 | 94.08 |
| 401 | .22 | .26 | .08 | .72 | 3.17 | .58 | 3.31 | .47 | 93.09 |
| 402 | .24 | .39 | .10 | .66 | 3.49 | .71 | 3.45 | .44 | 92.81 |
| 500 | .13 | .33 | .10 | .25 | 2.10 | .33 | 3.11 | .37 | 101.81 |
| 501 | .13 | .51 | .18 | .30 | 2.17 | .37 | 3.13 | .39 | 101.63 |
| 502 | .12 | .85 | .22 | .38 | 2.35 | .25 | 2.65 | .34 | 97.66 |
| 510 | .12 | .70 | .12 | .58 | 2.61 | .16 | 1.33 | .34 | 98.15 |
| 511 | .07 | .41 | .09 | .56 | 2.47 | .11 | 1.39 | .48 | 97.94 |
| 512 | .07 | 1.40 | .06 | .61 | 2.43 | .34 | 1.35 | .46 | 98.59 |
| 513 | 0 | 0 | .15 | .56 | 2.43 | .17 | 1.48 | .46 | 96.05 |

The internal arrangement of one reactor suitable for commercial operation of the present invention is diagrammatically illustrated in FIG. 6 of the accompanying drawings. In this FIG. 6 a series of plates or trays $P_1$ to $P_{35}$ are appropriately arranged in sequence within the reactor housing made of any suitable material such as stainless steel 316. The preheating zone of the reactor is defined by the region occupied by plates or trays $P_1$ to $P_3$; the oxidation zone is defined by plates or trays $P_4$ to $P_{28}$; the concentrating zone is defined by plates or trays $P_{29}$ and $P_{30}$ while the plate or tray $P_{31}$ is part of the heating zone. External steam-heater 18$x$ supplies the heat necessary to vaporize a portion of the cyclohexane being circulated through the heater by means of pump 19. The last zone, defined by the region occupied by plates or trays $P_{32}$ to $P_{35}$, is a stripper-cooler zone where cyclohexane is separated from the oxidation reaction products. Also in this last zone, inert gas being introduced below plate or tray $P_{35}$, takes up vaporized cyclohexane while at the same time cooling the liquid stream flowing countercurrent to the flow of the inert gas (which may, of course, be recycled reactor off-gases). Outlets 20 are provided below each of plates or trays $P_4$ to $P_{28}$ for introducing gases containing oxygen. These outlets 20 may advantageously be perforated tubes allowing the emerging gases containing oxygen to be mixed into the vapour or the liquid phase.

It will be understood that in this particular arrangement liquid cyclohexane with some added catalyst is introduced into the preheating zone of reactor 1 and the partial oxidation products of the cyclohexane leave reactor 1 below the last plate or tray in the stripper-cooler zone.

A further embodiment of the process of the present invention is similar to that illustrated in FIG. 3, but without cooler-condenser 11, circulating pump 21, heater 22, and with reactor 1 replaced by a reactor similar to that illustrated in FIG. 5, but having a preheating zone consisting of five stages, and having flooded plates (see FIG. 8).

In the process utilizing the reactor illustrated in FIG. 8, the inert gas flow is obtained by circulating a portion of the gases or vapours leaving the preheating zone of the reactor through a recirculating pump and a flowmeter. The inert gas entering the stripper-cooler zone of the reactor will have substantially the same composition as the stream of gases and vapours leaving the preheating zone, containing some cyclohexane and other low boiling materials in amounts mainly controlled by vapour-liquid relationships in the top zone of the reactor.

FIG. 7 is a flow sheet designed to simulate the operation of this process. Because of limitations of available pumping equipment, it was necessary, in the actual experimental runs, to separate, in condenser 23, the condensible components of the recirculated portion of the gases and vapours leaving the top zone of the reactor, and to pump and measure the resulting liquid and gas streams separately, with the liquid passing through measuring and storage system 24 and pump 25, and with the gas flowing through recirculating pump 19 and flowmeter 20, and subsequently to heat and re-combine these streams in heater-mixer 26 to form a stream of recirculating gases and vapours of substantially the same composition as the gases and vapours leaving the preheating zone at the top of the reactor.

A reactor having the same internal diameter as that in the foregoing examples was again constructed in such a way that liquids flow countercurrent to the gases. Within the reactor are three zones. The first zone, in the top portion of the reactor, functions as the preheating zone followed, in descending order, by the second zone which is the oxidation zone, and by the third zone which is the stripper-cooler zone.

Examples of actual operating runs carried out by the procedure outlined above with reference to apparatus illustrated in FIG. 6 and arranged as in FIG. 8 of the drawings are set forth in Table 5 and Table 6 hereinafter. In these runs, the recirculation of inert gases has been cut back to a low rate and a heat balance achieved under stable operating conditions so that no heat need be added or withdrawn from the reactor column itself. This mode of operation is referred to as "neat heat balance" operation and is illustrative of another suitable commercial process.

TABLE 6.—YIELD PERCENT FROM CYCLOHEXANE TO—

| | Run No. 867 | Run No. 868 |
|---|---|---|
| Cyclohexanone | 30.07 | 31.22 |
| Cyclohexanol | 46.44 | 45.92 |
| CHHP | 1.27 | 2.35 |
| Free and combined adipic acid | .47 | .31 |
| Hydroxycaproic acid | .52 | .34 |
| Cyclohexyl formate | .26 | .22 |
| Cyclohexyl acetate | .06 | .09 |
| Cyclohexyl propionate | | |
| Cyclohexyl butyrate | .42 | .39 |
| Cyclohexyl valerate | .64 | .34 |
| Cyclohexyl caproate | .16 | .14 |
| Propionic acid | .23 | .24 |
| Butyric acid | .50 | .43 |
| Valeric acid | 2.03 | 1.67 |
| Caproic acid | .80 | 1.09 |
| CO | 4.24 | 3.57 |
| $CO_2$ | .79 | .74 |
| Total percent cyclohexane accounted for | 88.87 | 89.08 |

Still another suitable arrangement of the reactor for use in the process illustrated by FIG. 7 is shown in FIG. 9 where the preheating comprises only one plate and the stripping zone contains no plates as such but does contain means for distribution of the recycle inert gases. This reactor is also operated as a flooded plate column in which the vapour space height at each plate is balanced against pressure drop cross the perforated plate.

The perforated plates employed in the flooded columns of FIGS. 8 and 9 are illustrated in FIGS. 10A and 10B. In FIG. 10A, 27 is the wall of the cylindrical reactor in which plate 28 is placed; 29 is the air-distribution system, further illustrated in FIG. 10B. Plate 28 contains holes uniformly distributed in the area defined by the air distribution system. These holes should be from 1/8" to 3/8" in diameter. The number of holes varies down the reactor such that the total area defined by the holes will permit the counter flowing gaseous stream to pass upward through plate 28; hence, more holes are required at the top of the column than at the bottom of the column since the volume of inert gases is much greater at the top than at the bottom.

In FIG. 10B is shown a vertical section through 1—1 of FIG. 10A. The air-distribution system, 29, is connected to plate 28 by nozzles, 30, which are sealed to air-inlet holes in the plate 28. The reverse weir, 31, on the plate entrains a vapour phase volume beneath the plate where air is mixed with upwardly flowing inert gases

TABLE 5

| | Run No. 867 | | | | Run No. 868 | | | |
|---|---|---|---|---|---|---|---|---|
| Average reaction zone temperature, °C | 174 | | | | 174 | | | |
| Reactor pressure, lb./sq. in. ga. | 180 | | | | 180 | | | |
| Total air flow to reaction zone, std. cu. ft./hr | 44 | | | | 39 | | | |
| Recirculation off-gas flow, std. cu. ft./hr | 20 | | | | 20 | | | |
| Total liquid flow to the column (feed plus condensed vapor) (lb./hr.) | 29.5 | | | | 40.7 | | | |
| Product flow from stripper-cooler section (lb./hr) | 27.3 | | | | 39.5 | | | |
| Catalyst conc. p.p.m. cobalt (based on product flow) | [1] 3.0 | | | | [1] 3.0 | | | |
| Oxygen partial pressure calculated from gas analysis (atm. abs.): | | | | | | | | |
| Below plate No | 6 | 9 | 12 | 15 | 6 | 9 | 12 | 15 |
| Oxygen partial pressure | .175 | .161 | .0751 | .0824 | .169 | .154 | .0644 | .0804 |
| Conc. of cyclohexanone (K) plus cyclohexanol (A) plus CHHP in product leaving stripper-cooler zone, percent | 6.19 | | | | 4.12 | | | |
| Conc. of cyclohexanone plus cyclohexanol in column reactor condensed vapor, percent | 0.057 | | | | 0.111 | | | |
| Air flow to reaction zone at indicated state (std. cu. ft./hr.): [2] | | | | | | | | |
| Stage | 1–12 | | | | 1–12 | | | |
| Flow | 3.67 | | | | 3.25 | | | |
| Cyclohexane feed composition, percent | Contains 0.2 (K plus A) [3] | | | | | | | |
| Liquid level at each oxidation zone stage (in.) | 6 | | | | 6 | | | |
| Yield to cyclohexanone plus cyclohexanol plus CHHP based on cyclohexane reacted, percent (1) | 77.79 | | | | 79.50 | | | |
| Yield to esters based on cyclohexane reacted, percent (2) | 1.53 | | | | 1.19 | | | |
| Total yield (1) plus (2), percent | 79.32 | | | | 80.69 | | | |
| Yield to cyclohexanone plus cyclohexanol plus CHHP at similar condition in single stage stirred oxidizer, percent | 66 | | | | 69 | | | |
| Gas-free liquid volume per reaction tray, cu. ft | .043 | | | | .044 | | | |
| Average liquid residence time per oxidation stage (Tr) (min.) | 3.7 | | | | 2.6 | | | |
| Total air feed/total gas-free liquid volume in oxidation state (std. cu. ft./hr.[2]/cu. ft.) (A/V) | 85 | | | | 74 | | | |
| Ratio of oxygen/gas-free liquid volume in oxidation state (O/V) (std. cu. ft./hr./cu. ft.) [2] | 18 | | | | 16 | | | |

[1] Catalyst injected in two locations.
[2] 0° C., 1 atmosphere.
[3] K=cyclohexanone, A=cyclohexanol.

which are primarily nitrogen but which also comprise some oxides of carbon and cyclohexane vapour. The mixed gases then flow upwardly into the liquid phase above through the perforations 32 in the plate. The vapour space height is determined by balancing with the pressure drop across the plate.

An illustration of an oxidation employing a reactor similar in design to that shown in FIG. 9 and operating under conditions of a stable "neat heat balance" is shown in Table 7.

TABLE 7

$K+A$ [1] production rate—1000 p.p.h.
Average reaction zone temperature—177° C.
Reactor pressure (top)—170 p.s.i.g.
Total air flow to reaction zone—26.5M s.c.f.h.
Recirculation off-gas flow—6.7M s.c.f.h. $N_2$, 7.5M s.c.f.h. total
Recirculation off-gas temperature—50° C.
Total liquid feed to column:
    Feed plus condensed vapors—17.7M p.p.h.
    Feed plus condensed vapors temperature—59° C.
Reactor effluent from stripper cooler section—14.7M p.p.h.
Catalyst concentration p.p.m. cobalt (based on prod. flow)—3 p.p.m.
Calculated partial pressure of $O_2$ in oxidation zone—0.2–0.06 atm. abs.
Concentration of $K+A+CHHP$ [1] in reactor effluent—7.1 wt. percent
Concentration of $K+A+CHHP$ [1] in reactor condensed vapors—0.05 wt. percent
Concentration of $K+A+CHHP$ [1] in reactor feed—0.25 wt. percent
Reaction stages with air addition—20
Preheat stages—1
Stripper cooler stages—1
Reactor volume (gas-free liquid)—310 cu. ft.
Reactor effluent temperature—162° C.
Reactor off-gas temperature—128° C.
Heat addition to system—0 p.c.u./hr.
Yield to $K+A+CHHP$ [1] (based on cyclohexane consumed)—77%
Average liquid residence time per oxidation stage $Tr$ (min.)—2.5
Ratio of oxygen/gas-free liquid volume in oxidation stage (O/V) (std. cu. ft./hr./cu. ft.)—18

It will be obvious to one skilled in the art that the quantity of oxygen reacting with cyclohexane on any plate or tray within the oxidation zone is a function of variables such as temperature, pressure, catalyst concentration and physical layout of the plate or tray. Moreover, one way of controlling the oxidation reaction is by varying the liquid level and liquid volume from plate to plate or stage to stage within the oxidation zone. Hence, it will readily apparent that many variations or modifications can be made to the process or apparatus described herein without departing from the spirit of the present invention.

[1] K=cyclohexanone. A=cyclohexanol. CHHP=cyclohexylhydroperoxide.

I claim:
1. A process for preparing precursors of adipic acid which comprises contacting a stream comprising liquid cyclohexane maintained at a temperature in the range 140–200° C. and at a pressure in the range 50–350 p.s.i.g. with oxygen at each of at least three successive oxidation stages by introducing in the vapor space of each stage a mixture of gases comprising molecular oxygen and inert gas, diluting said mixture with additional inert gas in the said vapor space to obtain a partial pressure of oxygen in the range 0.001–2 atmospheres; said oxygen being introduced in amounts such that substantially all of the oxygen introduced into each stage is consumed in that stage, causing the diluted mixture of gases to pass countercurrent through said cyclohexane in each stage and causing said inert gas to pass countercurrent through said cyclohexane through all preceding stages, and thereafter recovering precursors from the last of said stages.

2. The process of claim 1 wherein the average liquid residence time is less than eight minutes in each of said stages.

3. The process of claim 1 wherein the average liquid residence time is in the range 0.54–5.3 minutes.

4. The process of claim 2 wherein the ratio of oxygen to liquid volume in said stage is less than 60 hr.$^{-1}$.

5. The process of claim 3 wherein the ratio of oxygen to liquid volume is in the range 2.9–60 hr.$^{-1}$.

6. The process of claim 5 wherein at least a portion of the inert gas leaving the first oxidation stage is recycled to the last oxidation stage.

7. A process for preparing precursors of adipic acid which comprises introducing a stream comprising preheated liquid cyclohexane into the first of at least three successive oxidation stages; said stages being vertically positioned and arranged such that the liquid discharged from an upper stage is received in the next lower stage and at a rate such that the average liquid residence time in said stage is in the range 0.54–5.3 minutes; introducing air in the lower portion of each of said stages in an amount such that the ratio of the volume of gaseous oxygen to the total gas-free liquid volume in said stage is in the range 2.9–60 hr.$^{-1}$, diluting said air with inert gas, causing said diluted air to pass countercurrent to said liquid in each stage, maintaining the conditions such that substantially all of the oxygen introduced into each stage is consumed in that stage, causing the total inert gas to pass countercurrent to said liquid through all preceding higher oxidation stages and thereafter recovering said precursors.

8. The process of claim 7 wherein the temperature of said preheated cyclohexane is maintained such that said process is substantially adiabatic.

References Cited

UNITED STATES PATENTS 2,410,642  11/1946  Farkas et al.
2,825,742   3/1958  Schueler et al.
3,274,254   9/1966  Seddon.

BERNARD HELFIN, Primary Examiner

G. A. SCHWARTZ, Assistant Examiner

U.S. Cl. X.R.

260—631